US010452704B2

United States Patent
Chang et al.

(10) Patent No.: US 10,452,704 B2
(45) Date of Patent: *Oct. 22, 2019

(54) MEDIA CONTENT SEARCH BASED ON A RELATIONSHIP TYPE AND A RELATIONSHIP STRENGTH

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 512 days.

This patent is subject to a terminal disclaimer.

(21) Appl. No.: 14/829,362

(22) Filed: Aug. 18, 2015

(65) Prior Publication Data

US 2016/0147868 A1 May 26, 2016

Related U.S. Application Data

(63) Continuation of application No. 14/552,847, filed on Nov. 25, 2014.

(51) Int. Cl.
*G06F 17/30* (2006.01)
*G06F 16/435* (2019.01)
*G06F 16/35* (2019.01)
*G06F 16/36* (2019.01)
*G06F 16/28* (2019.01)
*G06F 16/33* (2019.01)

(52) U.S. Cl.
CPC .......... *G06F 16/435* (2019.01); *G06F 16/288* (2019.01); *G06F 16/3344* (2019.01); *G06F 16/35* (2019.01); *G06F 16/36* (2019.01)

(58) Field of Classification Search
None
See application file for complete search history.

(56) References Cited

U.S. PATENT DOCUMENTS

| 8,401,252 B2 | 3/2013 | Schneiderman et al. |
| 8,503,735 B2 | 8/2013 | Morita |
| 9,639,634 B1 * | 5/2017 | Greene ............ G06F 17/30053 |
| 2008/0021894 A1 * | 1/2008 | Styles ............... G06F 17/30684 |

(Continued)

FOREIGN PATENT DOCUMENTS

WO   WO-2013138370 A1 *   9/2013   ......... H04N 21/4314

OTHER PUBLICATIONS

Preliminary Amendment, dated Aug. 18, 2015, for U.S. Appl. No. 14/552,847, filed Nov. 25, 2014 by B.W. Chang et al., Total 5 pp. [57.325 (PrelimAmend)].

(Continued)

*Primary Examiner* — Aleksandr Kerzhner
*Assistant Examiner* — Eddy Cheung
(74) *Attorney, Agent, or Firm* — Konrad Raynes Davda & Victor LLP; Janaki K. Davda (57) ABSTRACT

Provided are techniques for a media content search based on a relationship type and a relationship strength. Selection of two objects in a media file in media content is received. Search criteria for a relationship type and a relationship strength between the two objects is received. One or more media files in the media content are identified in which the two objects have the relationship type and the relationship strength.

7 Claims, 8 Drawing Sheets

(56) References Cited

U.S. PATENT DOCUMENTS

| | | | |
|---|---|---|---|
| 2009/0192967 A1* | 7/2009 | Luo | G06N 5/003 |
| | | | 706/47 |
| 2010/0106573 A1* | 4/2010 | Gallagher | G06Q 30/02 |
| | | | 705/14.4 |
| 2010/0325218 A1* | 12/2010 | Castro | G06Q 10/10 |
| | | | 709/206 |
| 2011/0058028 A1 | 3/2011 | Sakai | |
| 2012/0263433 A1* | 10/2012 | Mei | G06Q 30/0276 |
| | | | 386/241 |
| 2012/0308202 A1 | 12/2012 | Murata et al. | |
| 2013/0174195 A1 | 7/2013 | Witenstein-Weaver | |

OTHER PUBLICATIONS

U.S. Patent Application with U.S. Appl. No. 14/552,847, filed Nov. 25, 2014, entitled, "Media Content Search Based on a Relationship Type and a Relationship Strength", invented by B.W. Chang et al., Total 24 pp. [57.325 (Appln)].

List of IBM Patents or Patent Applications Treated as Related, Total 2 pp, Aug. 18, 2015.

Office Action 1, dated Dec. 13, 2017, for U.S. Appl. No. 14/552,847, filed Nov. 25, 2014 by B.W. Chang et al., Total 27 pp. [57.325 (OA1)].

Response to Office Action 1, dated Mar. 13, 2018, for U.S. Appl. No. 14/552,847, filed Nov. 25, 2014 by B.W. Chang et al., Total 15 pp. [57.325 (ROA1)].

Ekin, A., A.M. Tekalp, R. Mehrotra, "Integrated Semantic-Syntactic Video Modeling for Search and Browsing", IEEE Transactions on Multimedia 6, No. 6, 2004, pp. 839-851 [Also Total 30 pp.].

Liu, C., Q. Huang, S. Jiang, and C. Xu, "Event Based News Video People Classification and Ranking Using Multimodality Features", 2010 IEEE International Conference on Multimedia and Expo (ICME), pp. 149-154, IEEE, 2010 [Also Total 6 pp.].

Sang, J. and C. Xu, "Robust Face-Name Graph Matching for Movie Character Identification", IEEE Transactions on Multimedia, vol. 14, No. 3, 2012, pp. 586-596 [Also Total 11 pp.].

Yuan, K, H. Yao, R. Ji, and X Sun, "Mining Actor Correlations with Hierarchical Concurrence Parsing", 2010 IEEE International Conference on Acoustics Speech and Signal Processing (ICASSP), pp. 798-801, IEEE, 2010 [Also Total 4 pp.].

Yuan, J., Z. Zha, Y. Zheng, M. Wang, X. Zhou, and T. Chua, "Utilizing Related Samples to Enhance Interactive Concept-Based Video Search", IEEE Transactions on Multimedia 13, No. 6, 2011, pp. 1343-1355 [Also Total 13 pp.].

Zhang, Y., C. Xu, H. Lu, and Y. Huang, "Character Identification in Feature-Length Films Using Global Face-Name Matching", IEEE Transactions on Multimedia, vol. 11, No. 7, Nov. 2009, pp. 1276-1288 [Also Total 13 pp.].

Final Office Action for U.S. Appl. No. 14/552,847, pp. 30, dated Jun. 29, 2018.

Response to Final Office Action for U.S. Appl. No. 14/552,847, pp. 20, dated Sep. 26, 2018.

Notice of Allowance 1, dated May 6, 2019, for U.S. Appl. No. 14/552,847, 14 pp., [57.325 (NOA1)].

Office Action 3 for U.S. Appl. No. 14/552,847, 34 pp., dated Nov. 15, 2018 [57.325 (OA3)].

Response to Office Action 3 for U.S. Appl. No. 14/552,847, 11 pp., dated Feb. 14, 2019 [57.325 (ROA3)].

* cited by examiner

MEDIA CONTENT SEARCH BASED ON A RELATIONSHIP TYPE AND A RELATIONSHIP STRENGTH

FIELD

Embodiments of the invention relate to a media content search based on a relationship type and a relationship strength.

BACKGROUND

In different media content (e.g., a video file, a movie file, a text file, a set of images, etc.) a relationship between two actors varies (e.g., from one movie to another movie). For example, in one movie, the relationship between two actors may be friends, while in another movie, the relationship between the same two actors may be rivals. Also, the relationship strengths may vary from one movie to another movie with some relationships being stronger than others.

SUMMARY

Provided is a method for a media content search based on a relationship type and a relationship strength. The method, comprises: receiving, with a processor of a computer, selection of two objects in a media file in media content; receiving search criteria for a relationship type and a relationship strength between the two objects; and identifying one or more media files in the media.

Provided is a computer program product for a media content search based on a relationship type and a relationship strength. The computer program product comprises a computer readable storage medium having program code embodied therewith, the program code executable by at least one processor to perform: receiving, by the at least one processor, selection of two objects in a media file in media content; receiving, by the at least one processor, search criteria for a relationship type and a relationship strength between the two objects; and identifying, by the at least one processor, one or more media files in the media content in which the two objects have the relationship type and the relationship strength.

Provided is a computer system for a media content search based on a relationship type and a relationship strength. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations, the operations comprising: receiving selection of two objects in a media file in media content; receiving search criteria for a relationship type and a relationship strength between the two objects; and identifying one or more media files in the media content in which the two objects have the relationship type and the relationship strength.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
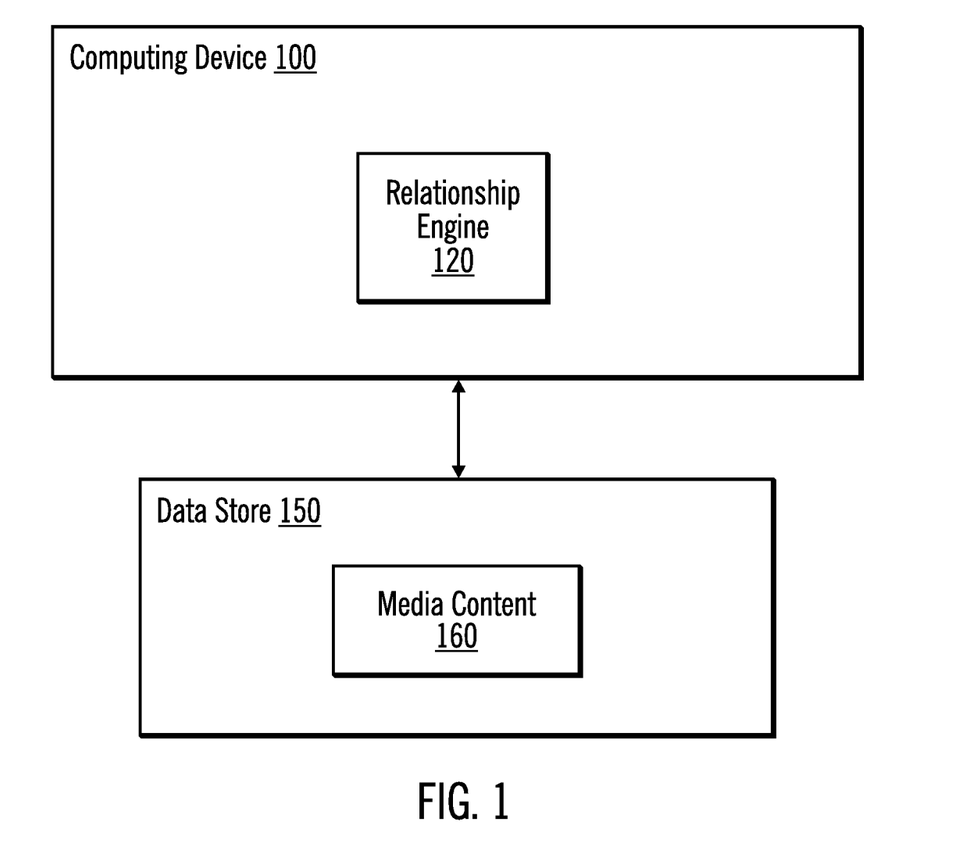
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is coupled to a data store 150. The computing device includes a relationship engine 120. The data store 150 includes media content 160. The media content 160 includes media files, such as a video file, a movie file, a text file, a set of images, etc.

With embodiments, while searching the media content 160, a user may select a pair of objects (e.g., humans, human faces, animals, animal faces, vehicles, buildings, etc.), provide a relationship type between the objects, and provide a relationship strength among the objects, and the relationship engine 120 identifies appropriate media content 160. A relationship type describes how two humans are associated (e.g., friends, rivals, father and son, etc.). A relationship strength describes how close a particular relationship is between two objects. For example, relationship strength may be based on how many times two objects appear in a same frame of a video file or in a same image in a set of images. For example, there may be a first pair of people who appear together 20% of the time in an entire video file, and there may be a second pair of people who appear together 2% of the time in the entire video file, so the first pair has a stronger relationship than the second pair.

In certain embodiments, while viewing any media content (e.g., viewing a movie or a set of photographs), a user may select multiple pairs of objects from one or more images (e.g., video frames, photographs, etc.). Upon selecting the one or more pairs of objects, the user may define a relationship type and a relationship strength as media content search criteria. Then, the relationship engine 120 searches for media content satisfying the search criteria.

Figure 2:
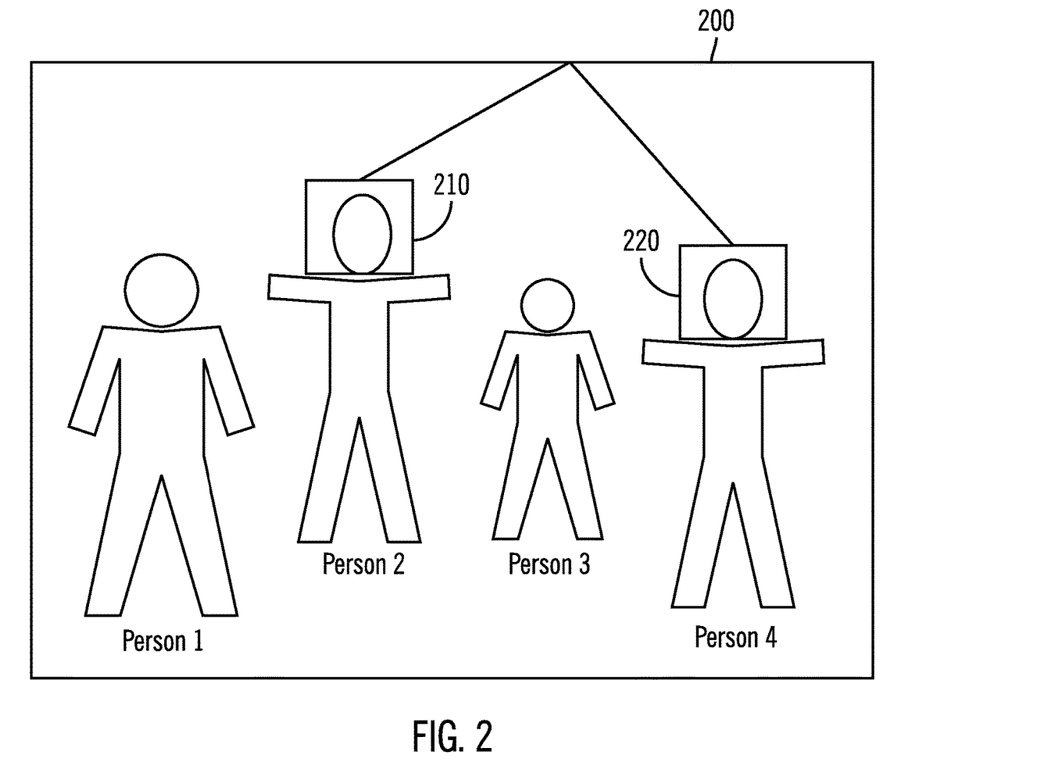
FIG. 2 illustrates selection of a pair of faces from a video frame in accordance with certain embodiments.

FIG. 2 illustrates selection of a pair of faces from a video frame 200 in accordance with certain embodiments. Although this example selects faces, in embodiments, other objects may be selected. In FIG. 2, four people are displayed. A user may select a pair of faces, by, for example, clicking on the faces (e.g., with a mouse, finger, pointing device, etc.). In certain embodiments, the relationship engine 120 may identify the selected faces by, for example, drawing a shape, such as the rectangles shown in FIG. 2, around the selected faces, highlighting the selected faces, etc. In various embodiments, the shape may be drawn around another portion of the person whose face was selected. In FIG. 2, a user has selected faces 210, 220. For example, while watching a movie, a user may pause the movie so that a video frame 200 is shown and select the pair of human faces 210, 220.

Figure 3:
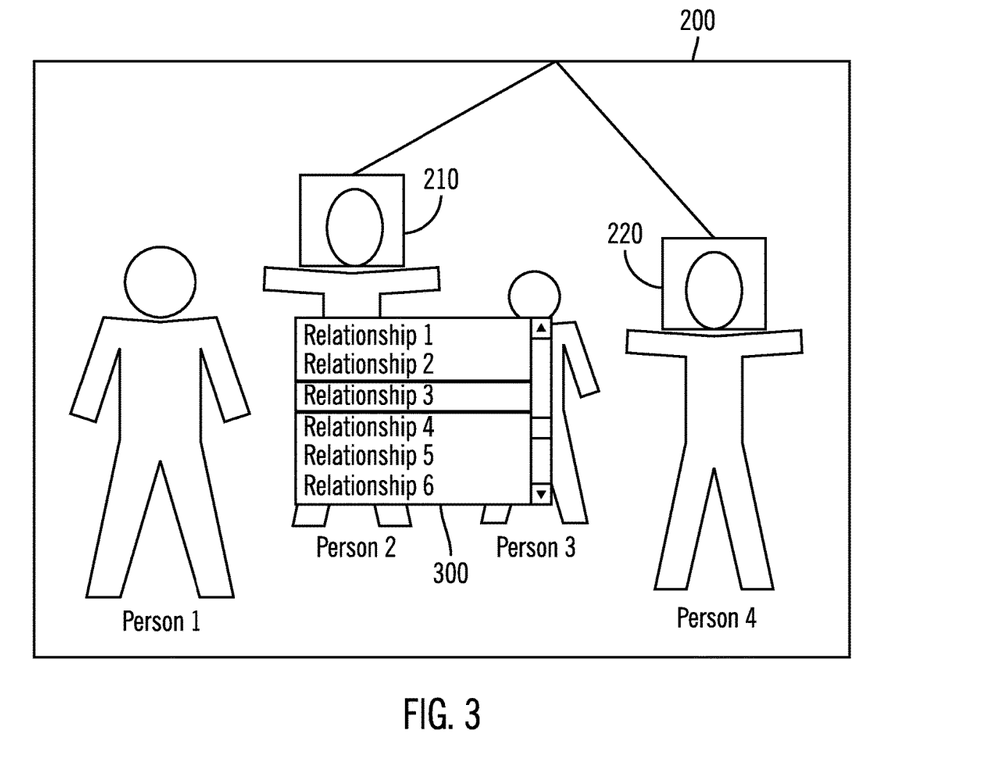
FIG. 3 illustrates selection of a relationship type between a pair of faces in accordance with certain embodiments.

FIG. 3 illustrates selection of a relationship type between a pair of faces in accordance with certain embodiments. Once a pair of faces have been selected, as was illustrated in FIG. 2, the relationship engine 120 displays a relationship type selector 300.

For example, the relationship engine 120 may display a list of relationship types with a scroll bar as the relationship type selector 300. A user may scroll through and select a relationship (e.g., by using a mouse to click on a particular relationship). For this example, relationship type 3 has been selected.

Figure 4:
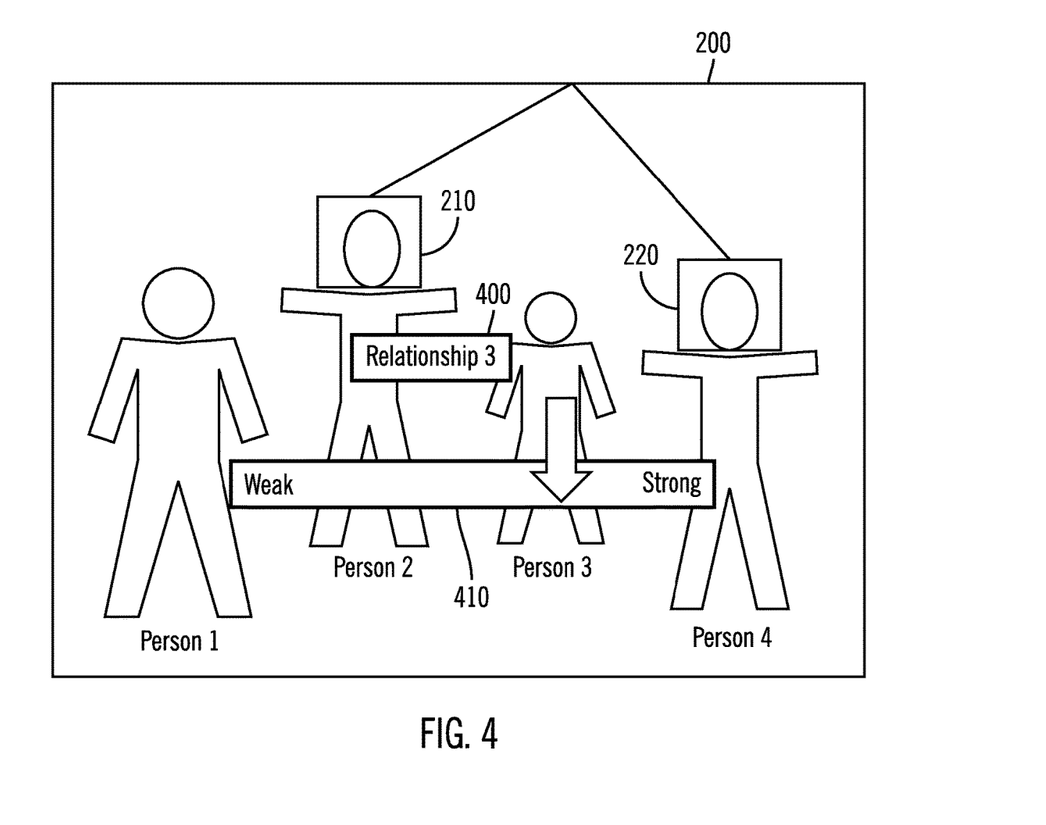
FIG. 4 illustrates selection of a relationship strength for a relationship type between a pair of faces in accordance with certain embodiments.

FIG. 4 illustrates selection of a relationship strength for a relationship type between a pair of faces in accordance with certain embodiments. Once a pair of faces and a relationship type have been selected, as was illustrated in FIGS. 2 and 3, the relationship engine 120 displays the selected relationship type 400 with a relationship strength selector 410. For example, the relationship engine 120 may display a slider as the relationship strength selector 410, and a user may select a range from "weak" to "strong". In other embodiments, the relationship engine 120 provides a list of strengths (e.g., very weak, weak, strong, very strong, etc.) that a user may select.

Then, the relationship engine 120 takes as input, the pair of faces, the relationship type, and the relationship strength, and searches for media content that matches the input.

Figure 5:
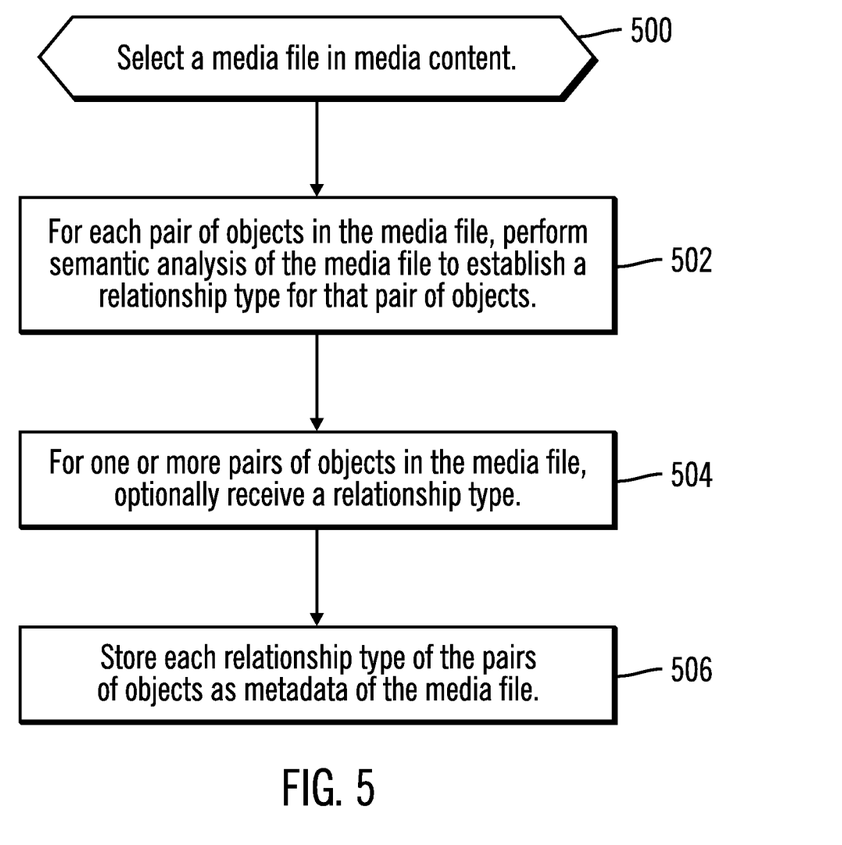
FIG. 5 illustrates, in a flow diagram, operations for identifying relationship types in accordance with certain embodiments.

FIG. 5 illustrates, in a flow diagram, operations for identifying relationship types in accordance with certain embodiments. Control begins in block 500 with the relationship engine 120 selecting a media file in the media content 160. In certain embodiments, the processing of FIG. 5 is performed for all media files in the media content 160. In certain embodiments, the processing of FIG. 5 is performed for a subset of media files, such as media files added to the media content since the last time the processing of FIG. 5 was performed. In block 502, for each pair of objects in the media file, the relationship engine 120 performs semantic analysis of the media file to establish a relationship type for that pair of objects.

In certain embodiments, the relationship engine 120 performs semantic analysis of the frames of the media file to establish a relationship type between each pair of objects. The frames may described as video frames (e.g., when the media file is a movie) or as individual photographs or images (e.g., when the media file is a set of photographs or images). This semantic analysis may be based on a predefined set of rules, such as rules for defining how a friendship relationship will be identified, how a rivalry relationship will be identified, etc.

In certain embodiments, the relationship engine 120 performs semantic analysis of any spoken words from the media file. In this case, the relationship engine 120 extracts any spoken keywords and performs semantic analysis of the spoken keywords. This semantic analysis may be based on another predefined set of rules.

In block 504, for one or more pairs of objects in the media file, the relationship engine 120 optionally receives a relationship type (e.g., by a user). This allows for manual tagging of relationship types.

In block 506, the relationship engine 120 stores each relationship type of the pairs of objects as metadata of the media file. Thus, each pair of objects may have one or more relationship types, and the relationship types may be automatically determined by the relationship engine 120 and/or may be provided by a user.

Figure 6:
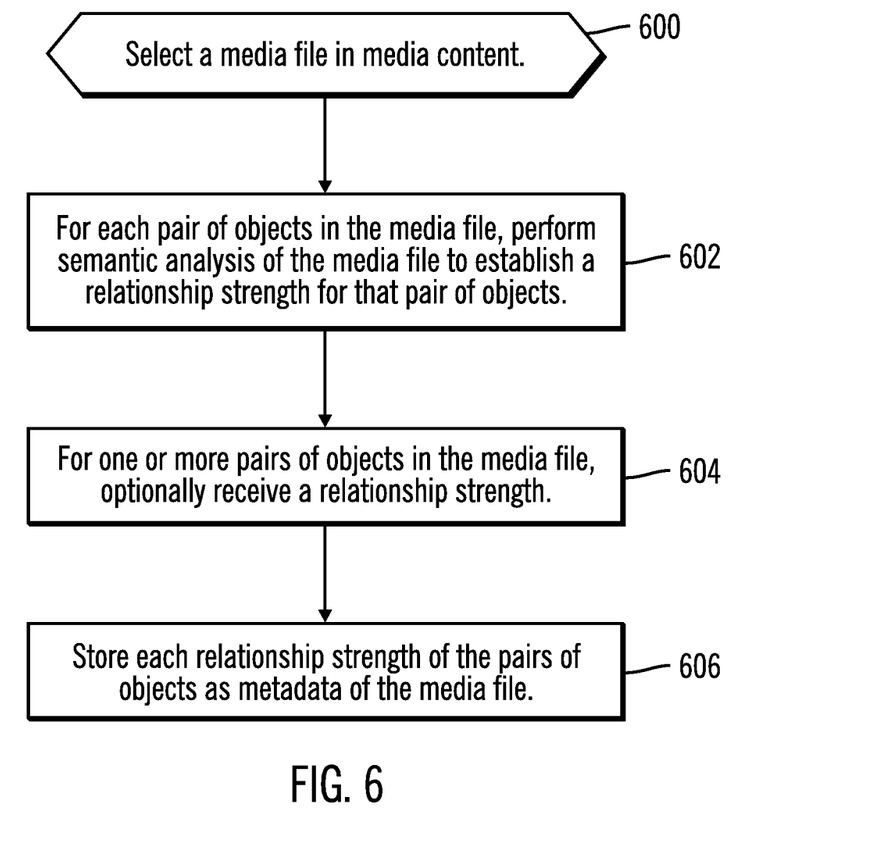
FIG. 6 illustrates, in a flow diagram, operations for identifying relationship strengths in accordance with certain embodiments.

FIG. 6 illustrates, in a flow diagram, operations for identifying relationship strengths in accordance with certain embodiments. Control begins in block 600 with the relationship engine 120 selecting a media file in the media content 160. In certain embodiments, the processing of FIG. 6 is performed for all media files in the media content 160. In certain embodiments, the processing of FIG. 6 is performed for a subset of media files, such as media files added to the media content since the last time the processing of FIG. 6 was performed. In block 602, for each pair of objects in the media file, the relationship engine 120 performs semantic analysis of the media file to establish a relationship strength for that pair of objects.

In certain embodiments, the relationship engine 120 performs semantic analysis of the frames of the media file to establish a relationship strength between each pair of objects. The frames may described as video frames (e.g., when the media file is a movie) or as individual photographs or images (e.g., when the media file is a set of photographs or images). This semantic analysis may be based on a predefined set of rules, such as rules for how much time the objects are together, how much time the objects are interacting together, etc. In certain embodiments, the relationship engine 120 validates the relationship strength against the set of rules. For example, if there are two characters identified in a video file, and the relationship engine 120 finds that they are friends, the relationship engine 120 may find that they are very close friends if they are frequently together in multiple frames of the video file, talking to each other frequently, etc., and then the relationship engine 120 identifies the relationship strength as strong. As another example, if there are two characters present in a video file, but they are together only for a few frames of that video file, the relationship engine 120 identifies the relationship strength as weak.

In certain embodiments, the relationship engine 120 performs semantic analysis of any spoken words from the media file. In this case, the relationship engine 120 extracts any spoken keywords and performs semantic analysis of the spoken keywords. This semantic analysis may be based on another predefined set of rules.

In block 604, for one or more pairs of objects in the media file, the relationship engine 120 optionally receives a relationship strength (e.g., by a user). This allows for manual tagging of relationship strengths.

In block 606, the relationship engine 120 stores each relationship strength of the pairs of objects as metadata of the media file. Thus, each pair of objects may have one or more relationship strengths, and the relationship strengths may be automatically determined by the relationship engine 120 and/or may be provided by a user.

Also, the media files may be indexed based on the relationship type and the relationship strength between two objects.

Figure 7:
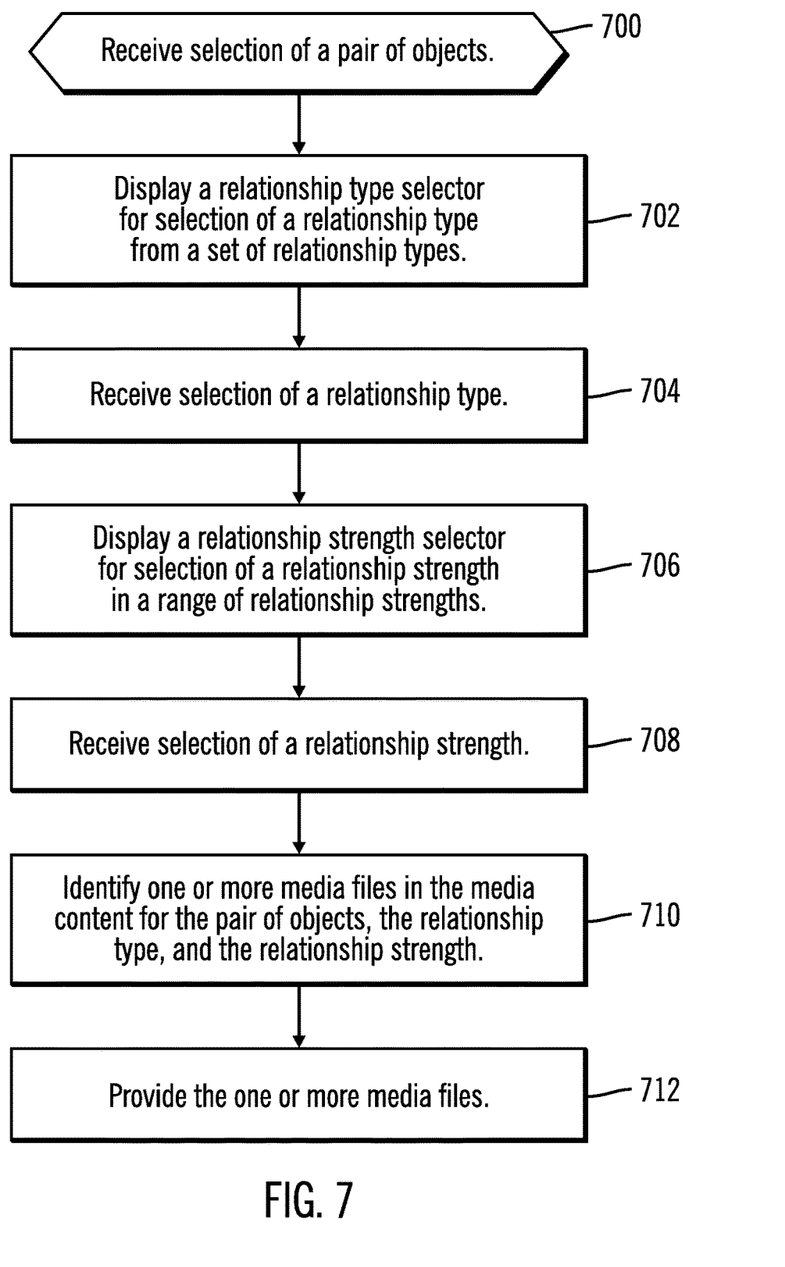
FIG. 7 illustrates, in a flow diagram, operations for identifying media files based on a pair of objects, a relationship type, and a relationship strength in accordance with certain embodiments.

FIG. 7 illustrates, in a flow diagram, operations for identifying media files based on a pair of objects, a relationship type, and a relationship strength in accordance with certain embodiments. Control begins in block 700 with the relationship engine 120 receiving selection of a pair of objects. In block 702, the relationship engine 120 displays a relationship type selector for selection of a relationship type from a set of relationship types. In block 704, the relationship engine 120 receives selection of a relationship type. In block 706, the relationship engine 120 displays a relationship strength selector for selection of a relationship strength in a range of relationship strengths. In block 708, the relationship engine 120 receives selection of a relationship strength.

In block 710, the relationship engine 120 identifies one or more media files in the media content for the pair of objects, the relationship type, and the relationship strength. That is, the relationship engine 120 identifies one or more media files in the media content in which the two objects have the relationship type and the relationship strength. In block 712, the relationship engine 120 provides (e.g., displays) the identified one or more media files (e.g., to the user who provided the selection of the pair of objects, the relationship type, and the relationship strength).

Thus, based on selection of any pair of faces from one or more video frames, the relationship engine 120 displays a list of possible relationship types available between the selected two faces in different videos in the media content (e.g., which may be media content accessed in data stores on the internet). Upon receiving selection of a relationship type, the relationship engine 120 requests another search parameter, which is relationship strength, and a user may define the relationship strength based on a range. Next, based on the selection of above parameters, the relationship engine 120 identifies appropriate video files having the same relationship type between the selected faces and having the relationship strength. In certain embodiments, a relationship may be described as R1-R2 to indicate a relationship between 1 and 2. Upon searches of the media content, the relationship information discovered above is presented.

In certain embodiments, the relationship engine 120 discovers movie characters' relationship types and strengths and makes this relationship information (type and strength) available to further searches.

Figure 8:
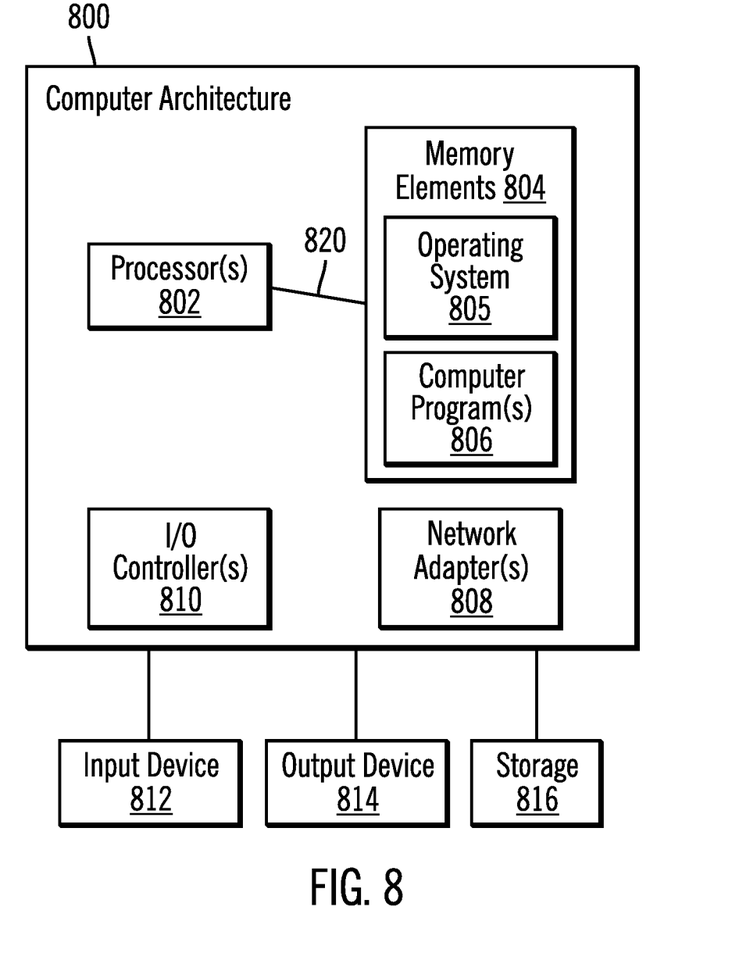
FIG. 8 illustrates, in a block diagram, a computer architecture that may be used in accordance with certain embodiments.

FIG. 8 illustrates a computer architecture 800 that may be used in accordance with certain embodiments. In certain embodiments, computing device 100 may implement computer architecture 800. The computer architecture 800 is suitable for storing and/or executing program code and includes at least one processor 802 coupled directly or indirectly to memory elements 804 through a system bus 820. The memory elements 804 may include local memory employed during actual execution of the program code, bulk storage, and cache memories which provide temporary storage of at least some program code in order to reduce the number of times code must be retrieved from bulk storage during execution. The memory elements 804 include an operating system 805 and one or more computer programs 806.

Input/Output (I/O) devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening private or public networks. Modems, cable modem and Ethernet cards are just a few of the currently available types of network adapters 808.

The computer architecture 800 may be coupled to storage 816 (e.g., any type of storage device; a non-volatile storage area, such as magnetic disk drives, optical disk drives, a tape drive, etc.). The storage 816 may comprise an internal storage device or an attached or network accessible storage. Computer programs 806 in storage 816 may be loaded into the memory elements 804 and executed by a processor 802 in a manner known in the art.

The computer architecture 800 may include fewer components than illustrated, additional components not illustrated herein, or some combination of the components illustrated and additional components. The computer architecture 800 may comprise any computing device known in the art, such as a mainframe, server, personal computer, workstation, laptop, handheld computer, telephony device, network appliance, virtualization device, storage controller, etc.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
storing, with a processor of a computer, a plurality of media files, wherein metadata for relationship types between pairs of objects and a relationship strength for each of the relationship types is stored for each media file of the plurality of media files;
while a media file of the plurality of media files is playing, pausing, with the processor of a computer, the media file to display a video frame of the media file;
receiving, with the processor of the computer, selection of two objects of a plurality of objects in the video frame;
displaying, with the processor of the computer, a relationship type selector in the video frame;
receiving, with the processor of the computer, search criteria for a relationship type between the two objects from the relationship type selector in the video frame;
displaying, with the processor of the computer, a relationship strength selector in the video frame;
receiving, with the processor of the computer, a relationship strength between the two objects from the relationship strength selector in the video frame;
identifying, with the processor of the computer, one or more media files of the plurality of media files in which the two objects have the relationship type and the relationship strength; and
displaying, with the processor of the computer, the identified one or more media files of the plurality of media files.

2. The computer-implemented method of claim 1, further comprising:
providing, with the processor of the computer, a list of relationships from which the relationship type is selected.

3. The computer-implemented method of claim 1, further comprising:
providing, with the processor of the computer, a relationship strength range from which the relationship strength is selected.

4. The computer-implemented method of claim 1, further comprising:
performing, with the processor of the computer, semantic analysis of media content and spoken words of the plurality of media files to identify one or more relationship types between each pair of objects based on a predefined set of rules that define each of the relationship types.

5. The computer-implemented method of claim 1, wherein the plurality of media files are indexed based on the relationship type and the relationship strength between the two objects.

6. The computer-implemented method of claim 1, wherein the two objects represent human faces.

7. The computer-implemented method of claim 1, further comprising:
  performing, with the processor of the computer, semantic analysis of media content and spoken words of the plurality of media files to identify a relationship strength between each pair of objects, wherein the semantic analysis is based on a predefined set of rules including rules for how much time each pair of objects are together and how much time each pair of objects are interacting.

* * * * *